(12) United States Patent
Bense et al.

(10) Patent No.: US 9,897,131 B2
(45) Date of Patent: Feb. 20, 2018

(54) METHOD AND A CONNECTING SYSTEM FOR THE JOINING OF MOULDED PARTS

(71) Applicant: Airbus Operations GmbH, Hamburg (DE)

(72) Inventors: Rolf Bense, Hamburg (DE); Eugen Gorr, Hamburg (DE); Joerg Jendrny, Hamburg (DE); Tim Strohbach, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 408 days.

(21) Appl. No.: 13/826,918

(22) Filed: Mar. 14, 2013

(65) Prior Publication Data
US 2013/0239398 A1    Sep. 19, 2013

Related U.S. Application Data

(60) Provisional application No. 61/610,501, filed on Mar. 14, 2012.

(30) Foreign Application Priority Data

Mar. 14, 2012 (DE) .................. 10 2012 204 015

(51) Int. Cl.
*F16B 39/00*     (2006.01)
*F16B 19/05*     (2006.01)
(Continued)

(52) U.S. Cl.
CPC ............. *F16B 39/00* (2013.01); *B21J 15/022* (2013.01); *B21J 15/025* (2013.01); *B21J 15/36* (2013.01);
(Continued)

(58) Field of Classification Search
CPC ........ F16B 39/00; F16B 19/05; F16B 19/086; F16B 5/04; B21J 15/36; B21J 15/025;
(Continued)

(56) References Cited

U.S. PATENT DOCUMENTS 4,978,270 A    12/1990  Ackerman
5,762,456 A *  6/1998  Aasgaard .................. 411/29
(Continued)

FOREIGN PATENT DOCUMENTS

| DE | 2334385 | 1/1975 |
| DE | 9304681 | 7/1993 |
| DE | 102010000500 | 8/2011 |

OTHER PUBLICATIONS

Machine Translation of DE9304681, Mar. 1993.*
German Search Report, dated Mar. 14, 2012.

*Primary Examiner* — Ryan J Walters
(74) *Attorney, Agent, or Firm* — Greer, Burns & Crain, Ltd.

(57) ABSTRACT

A method for the connection of moulded parts, wherein a locking collar pin with locking grooves or with an external thread, is driven through the moulded parts and subsequently a locking collar is locked together with at least some of the locking grooves, or with threaded sections of the locking collar pin, by the application of radial pressure, or by means of a screwing operation. A connecting system with a locking ring pin, which has a punching section for purposes of punching through the moulded parts, and also locking grooves for purposes of active engagement with a locking ring; the latter extends over at least two adjacent locking grooves in the axial direction, or over at least two adjacent threads in the axial direction.

9 Claims, 5 Drawing Sheets

(51) Int. Cl.
  *F16B 19/08* (2006.01)
  *B21J 15/02* (2006.01)
  *B21J 15/36* (2006.01)
  *F16B 5/04* (2006.01)
  *B29C 65/56* (2006.01)
  *B29C 65/00* (2006.01)

(52) U.S. Cl.
  CPC ............ *F16B 19/05* (2013.01); *F16B 19/086* (2013.01); *B29C 65/562* (2013.01); *B29C 66/02242* (2013.01); *B29C 66/1122* (2013.01); *B29C 66/21* (2013.01); *B29C 66/41* (2013.01); *B29C 66/721* (2013.01); *B29C 66/7212* (2013.01); *F16B 5/04* (2013.01); *Y10T 29/49948* (2015.01); *Y10T 29/5377* (2015.01)

(58) Field of Classification Search
  CPC .. B21J 15/022; B29C 66/02242; B29C 66/21; B29C 66/721; B29C 66/7212; B29C 66/41; B29C 66/1122; B29C 65/562; Y10T 29/5377; Y10T 29/49948
  See application file for complete search history.

(56) References Cited

U.S. PATENT DOCUMENTS

| | | |
|---|---|---|
| 6,527,490 B1 | 3/2003 | Donhauser |
| 2008/0038077 A1* | 2/2008 | Aasgaard .................. 411/29 |

\* cited by examiner

METHOD AND A CONNECTING SYSTEM FOR THE JOINING OF MOULDED PARTS

CROSS-REFERENCES TO RELATED APPLICATIONS

This application claims the benefit of U.S. Provisional application 61/610,501 filed Mar. 14, 2013 and German patent application No. 10 2012 204 015.3 filed Mar. 14, 2013, the entire disclosures of which are incorporated herein by way of reference.

BACKGROUND OF THE INVENTION

The invention concerns a method and a connecting system for the joining of moulded parts.

A method of known art for the joining of moulded parts is so-called punch riveting with a solid rivet. Punch riveting often finds application in automotive construction and more generally in the sheet metal processing industry on thin sheets of a very wide variety of metallic materials. Suitable materials are, for example, light metals such as aluminium and magnesium, or ferrous metals such as steel. However, punch riveting also allows the joining of a metallic moulded part to a plastic-based moulded part and thus the manufacture of hybrid joints. By virtue of the relatively low strength of the joint under tensile head loading in comparison to the shear strength, a punch rivet joint is often used only at locations that are subjected to shear loading.

Punch riveting with a solid rivet is based on a combined perforation and pressure forming of the moulded parts, in which a rigid solid rivet generates a force and a form fit point joint. For purposes of manufacturing the joint the moulded parts are fixed on a die by means of a hold-down device. The punch rivet is then driven by means of a riveting header through the moulded parts and in this manner the latter are perforated. As a result of the contour of the die and the pressure force applied via the riveting header and the hold-down device the material of the moulded part on the die flows into a peripheral groove on the shank of the punch rivet. The flow of material is thereby opposed to, or transverse to, the punching direction. At the same time the head of the punch rivet is pressed against the riveting header-side moulded part, or if it is a countersunk head, it is impressed into the riveting header-side moulded part. The main component of the strength of the joint under tensile head loading is found in the form fit, which is generated from the undercut on the head of the punch rivet and the filling of the groove on the shank of the punch rivet. In order to increase the form fit component for higher load-bearing capacities, so-called multi-region rivets can be deployed. The multi-region rivets have a plurality of parallel shank grooves, which increase the form fit when the rivet is in the set state. Examples of multi-region rivets are described in the U.S. Pat. Nos. 6,527,490 B1 and 4,978,270. However, in general it has been shown that the filling of the shank grooves is strongly dependent on the respective material of the moulded parts. In DE 10 2010 000 500 A1 it is therefore proposed that for purposes of applying punch rivets to all punchable materials, the punch rivet should be locked outside the moulded parts. For this purpose a locking collar is set in place on a shank section led out through the punched hole, and is pressed together with a shank groove by means of an axial upsetting force.

An alternative joining method for purposes of connecting sheet metal-type moulded parts is joining by means of a locking collar pin. In this method a hole is introduced into the moulded parts before the actual riveting operation, through which hole the locking collar pin is then led out and subsequently locked with a locking collar squeezed onto the locking collar pin. The result is a joint with a high load-bearing capacity, which by virtue of parallel locking grooves has a high tensile head strength and also has high reliability in the locked state. However, by virtue of the separate perforation operation before the riveting process, this method is more labour-intensive than the punch rivet method.

SUMMARY OF THE INVENTION

An object of the invention is to create a method and a connecting system for the joining of moulded parts, which removes the disadvantages cited above and enables a joint that has a high load-bearing capacity.

In an inventive method for the joining of moulded parts a locking collar pin with locking grooves, or with an external thread, is punched through the moulded parts, and subsequently a locking collar is locked with at least two locking grooves or with two threaded sections (two threads) by the application of radial pressure, or by means of a screwing or threading operation.

The inventive method enables the implementation of a joint with a higher strength compared with that of a conventional punch rivet process, since the locking collar pin is simultaneous engaged with a plurality of locking grooves, or threaded sections. In that the locking collar is locked together with the locking collar pin by means of radial pressure or a screwing force, and not by means of an axial, or essentially axial, upsetting force, as in the case of the above-cited DE 10 2010 000 500 A1, the locking collar in the locking operation is not upset, or is virtually not upset, and its height before the application of pressure corresponds, or virtually corresponds, to its height after the application of pressure. Since the locking collar pin is itself driven through the moulded parts and the punched hole that accommodates it is thus formed automatically, there is no initial perforation operation. Thus in the inventive method the advantages of a locking collar pin—high strength—are combined with the advantages of punch riveting—no initial perforation operation. Here the term "radial" means not only exclusively, but also primarily, or essentially, in the radial direction.

An inventive connecting system for the joining of moulded parts, in particular for purposes of executing the inventive method, has a locking collar pin for purposes of punching the moulded parts, and a locking collar for purposes of locking the locking collar pin, wherein the locking collar extends over at least two adjacent locking grooves in the axial direction, or over at least two adjacent threaded sections in the axial direction.

The punching section enables execution of a high-quality punching operation, that is to say, the formation of a precise punched hole, and the avoidance of any unwanted deformation of the moulded parts in the edge region of the punched hole. Moreover the punching section enables execution of the punching operation with a minimal punching force. The fact that the locking collar extends over at least two adjacent locking grooves in the axial direction, or over at least two adjacent threaded sections in the axial direction, allows the formation of a multiplicity of undercuts, and thus a high strength for the joint. Here, in contrast to the locking grooves, the external thread enables the locking collar to be unscrewed. In particular when opening the joint the locking action can be quickly and easily released by unscrewing the locking collar.

In order to be able to screw on the locking collar for purposes of the locking operation, the latter can have an internal thread corresponding to the external thread of the locking collar pin. Here it is particularly advantageous if the punching section of the locking collar pin has, for example, a lead-in chamfer for purposes of guiding on the locking collar, or is formed with a small axial extent and is therefore narrow. However, the form of the punching section need not be taken into account during screwing operations, if the punching section can be, and is, removed before the locking collar is screwed on, and before it is screwed off.

For purposes of reducing the complexity of the device the locking collar in one example of an embodiment has a cutting edge. Such a locking collar can be used as a cutting die and immediately after the punching operation can be squeezed onto the locking collar pin by the application of radial pressure, or screwed onto the latter. A tool change for the application of radial pressure by the locking collar is therefore not necessary.

In an alternative example of an embodiment, the cutting edge is formed on a shaping projection on the periphery of the end face of the locking collar. The shaping projection allows the use of the locking collar as a shaping die and the latter can likewise, immediately after the punching operation, be radially squeezed, or screwed, onto the locking collar pin. A tool change for the application of radial pressure by the locking collar is therefore also not necessary in this example of an embodiment. The shaping of the locking collar-side moulded part thereby causes strain hardening of the same in the region of the punched hole, and thus leads to an increase in the strength of the joint.

In an alternative example of an embodiment, a cutting ring manufactured discretely from the locking collar is provided with a cutting edge. By this means the two functions of punching and locking are separated, whereby the cutting ring undertakes the punching function and the locking collar undertakes the locking function. In this manner the cutting ring and the locking collar can be optimally matched to their respective functions.

In a further alternative example of an embodiment a shaping ring manufactured discretely from the locking collar is provided with a cutting edge. By this means the shaping ring acts as a shaping die and by virtue of the separation of functions the shaping ring and the locking collar can be optimally matched to their respective punching and locking functions.

BRIEF DESCRIPTION OF THE DRAWINGS

In what follows preferred examples of embodiments of the invention are elucidated in more detail with the aid of very simplified schematic representations. Here.

DETAILED DESCRIPTION OF THE PREFERRED EMBODIMENTS

Figure 1:
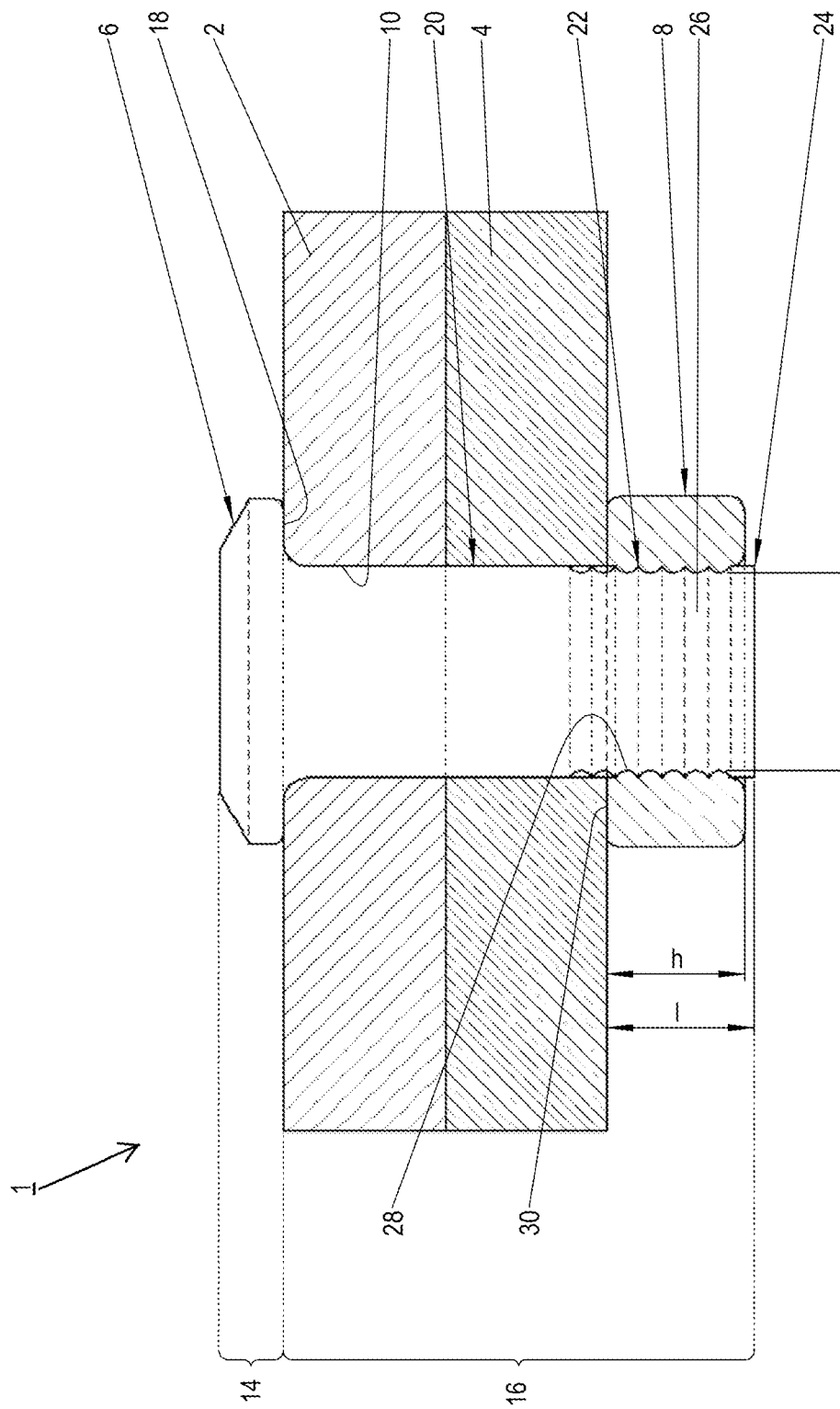
FIG. 1 shows a section through a joint using a first example of an embodiment of an inventive connecting system.

FIG. 1 shows a joint 1 between two moulded parts 2, 4 with a first example of an embodiment of an inventive connecting system. Needless to say, more than two moulded parts 2, 4 can also be joined with the inventive connecting system. The moulded parts 2, 4 are designed in the form of plates in the region of the joint 1, and in each case preferably are made of a material that can be cold formed such as aluminium, magnesium, steel, or an appropriate metal alloy. However, the moulded parts 2, 4 can also be manufactured from non-metallic materials that are suitable for punching operations such as wood, or a fibre composite material, which for example has a multiplicity of plastic, natural, or metal fibres embedded in a plastic matrix, or a metal matrix. The connecting system has a locking collar pin 6 and a locking collar 8. The locking collar pin 6 is sectionally led out through a punched hole 10 extending through the moulded parts 2, 4, and at its end is locked with the locking collar 8.

The locking collar pin 6 includes a metallic material such as steel, or a non-metallic material such as an oxide ceramic. It has a head 14 and a shank 16.

Figure 2:
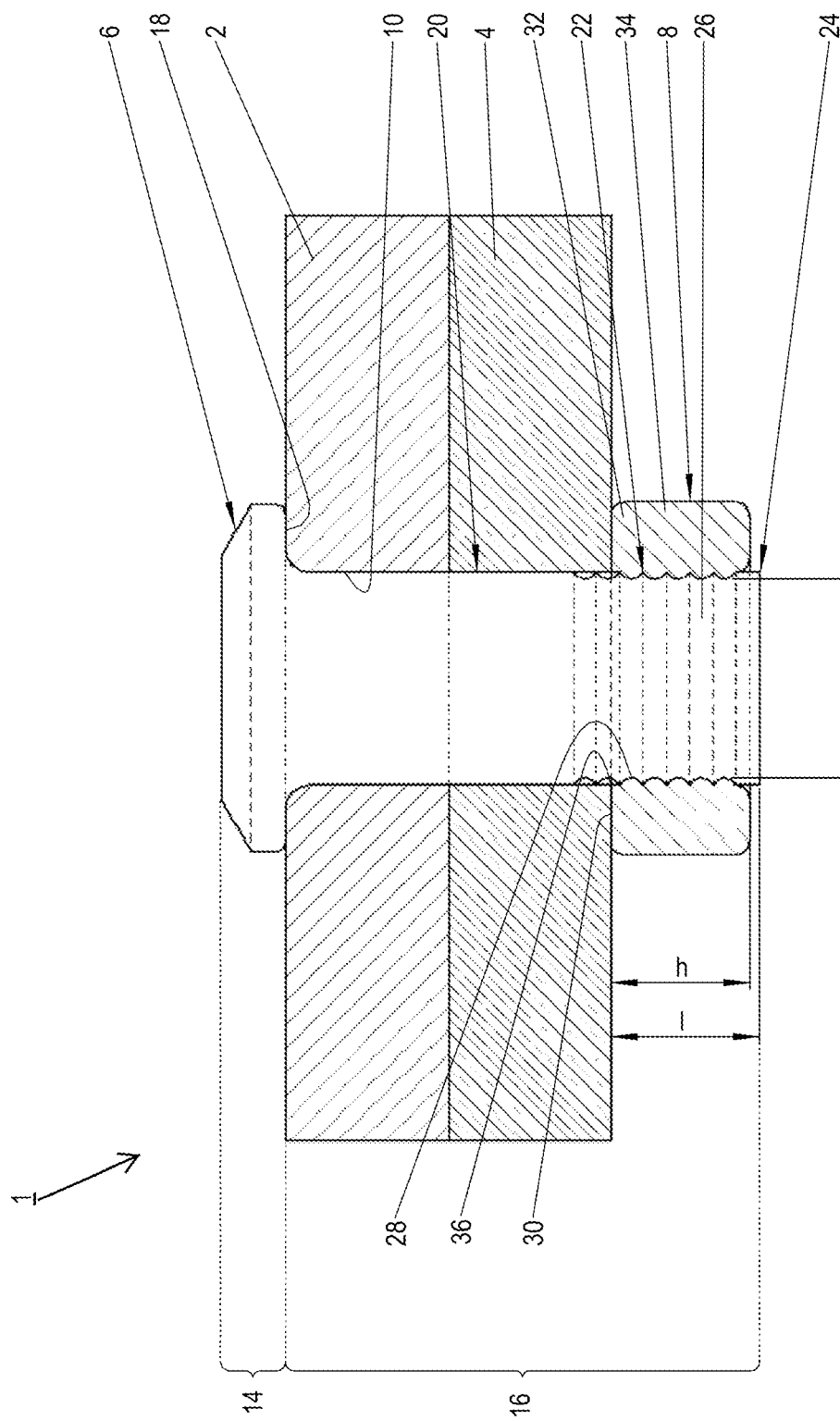
FIG. 2 shows a section through a joint using a second example of an embodiment of the inventive connecting system.

In this example of an embodiment the head 14 is designed as a universal head with a planar seating face 18 for purposes of a real seating on the upper, i.e., head-side moulded part 2 in accordance with the representation in FIG. 2. Alternatively the head 14 is designed, for example, as a countersunk head.

The shank 16 has a cylindrical shape with a central shank section 20, a locking section 22, and also a punching section 24. However, it can also have another shape, and can be elliptical, for example.

The central shank section 20 extends orthogonally from the head 14 and has a smooth peripheral wall. However, it can also be enlarged conically, i.e., in the form of a cone, in the direction of the head 14, so that during the punching operation strain hardening of the moulded parts 2, 4 occurs in the punched hole region of the central shank section 20, as a result of radial enlargement of the punched hole 10 in certain regions.

The locking section 22 serves to lock the joint 1 with the locking collar 8. It has a multiplicity of locking grooves 26 located parallel and adjacent to one another in the axial direction, i.e., the punching direction; these grooves have a uniform core diameter d, and in this example of an embodiment are in each case evenly spaced apart from one another in the axial direction. The locking grooves 26 can, however, also have a variable spacing relative to one another. Alternatively the locking grooves 26 are designed as an external thread.

The punching section 24 is formed at the end of the shank 16 as an extension of the locking section 22. It serves to form the punched hole 10, and in the example of an embodiment shown here has a cylindrical shape. Alternatively, however, it can taper radially in the direction of the head 14, for example in the form of a cone. However, it can also be enlarged radially in the direction of the head 14, so that during the punching operation strain hardening of the moulded parts 2, 4 occurs over the whole of the punched hole region as a result of radial enlargement of the punched hole 10. The punching section 24 is preferably hardened by means of local heat treatment.

The locking collar 8 serves to lock the locking collar pin 6, i.e., to lock the joint 1. It is made preferably of a metallic material that is easy to deform, and a through hole 28 passes through the collar. In order to enable locking of the locking collar 8 with at least some of the locking grooves 26, or threaded sections, of the locking collar pin 6, the locking collar 8 has a height h, which enables locking with at least two of the locking grooves adjacent to one another in the axial direction, or with two threaded sections adjacent to one another in the axial direction. The locking collar 8 preferably has a height h, which is somewhat less than a length 1 of a shank region of the locking collar pin 6 projecting out of the punched hole 10, so that an active engagement takes place with as large a number of locking grooves 26 as possible, and so that the end face of the locking collar 8 does not protrude beyond the punching section 24 after the locking operation. For purposes of seating on what is, in accordance with FIG. 1, the lower moulded part 4, the locking collar 8 has an end face contact surface 30 which is free of steps, i.e., is planar. For purposes of achieving an optimal locking operation with at least some of the locking grooves 26 while subjecting these to minimal radial compressive force the locking collar 8 is preferably not hardened.

The through hole 28 has an internal diameter such that, on the one hand, a punched billet can fall freely out through the through hole 28, and on the other hand, only a minimum radial deformation of the locking collar 8 is necessary for purposes of radial compression together with the locking section 22. However, if the locking section 22 has an external thread instead of the locking grooves 26, the through hole 28 can also be provided with an internal thread corresponding with the external thread.

The first example of an embodiment of the inventive connecting system described above enables the execution of a two-stage joining method. "Two-stage" means that the joining operation does not take place in a single stroke, but rather that a tool change is necessary. The moulded parts 2, 4 are clamped together between a hold-down device and a die. The punching section 24 of the locking collar pin 6 is then pressed against the moulded parts 2, 4 by means of a riveting header. The locking collar pin 6 penetrates into the moulded parts 2, 4 to the extent that the head 14 of the pin is seated on the upper moulded part 2. If the head 14 is designed as a countersunk head it is impressed into the upper moulded part 2 in a manner appropriate to the depression in the latter. A punched billet is ejected through the die. After the formation of the punched hole 10 the die is removed and the locking collar 8 is positioned on the locking section 22 of the locking collar pin 6, and is subjected to a radial compressive force such that it is squeezed together with at least two of the locking grooves 26.

FIG. 2 shows a second example of an embodiment of a joint 1 between two moulded parts 2, 4 that are connected with one another using a second example of an embodiment of the inventive connecting system. In contrast to the first example of an embodiment in FIG. 1, in this example of an embodiment a die is integrated into a locking collar 8. Thus the locking collar 8 in this example of an embodiment also undertakes the punching function and for purposes of forming the die has an integral die section 32 and also a deformation section 34, through both of which passes a through hole 28.

The die section 32 has a radially internal cutting edge 36, which in the outlet region of the through hole 28 is provided with an end face contact surface 30 that is free of steps, i.e., is planar. The cutting edge 36 allows the use of the locking collar 8 as a cutting die, wherein for purposes of stabilizing the shape of the locking collar 8 during the punching operation, and for purposes of achieving a high quality punching operation, the die section 32 and in particular the cutting edge 36 can be hardened by means of local heat treatment, The deformation section 34 serves to provide radial squeezing of the locking collar 8 together with at least some of the locking grooves 26 of the locking collar pin 6. For purposes of achieving an optimal locking operation with at least some of the locking grooves 26, whilst subjecting the latter to minimal radial compression force, the deformation section 34 is preferably not hardened.

The locking collar pin 6 corresponds to that in the first example of an embodiment in FIG. 1, and has a central shank section 20, a locking section 22 and a punching section 24.

The second example of an embodiment of the inventive connecting system enables the execution of a single-stage joining method. "Single-stage" means that the locking collar 8 acts as a die and thus the joining operation takes place in one stroke, and therefore no tool change is required after the punching operation in order to apply pressure with the locking collar 8. The moulded parts 2, 4 are clamped together between a hold-down device and the locking collar 8 acting as a cutting die. For purposes of forming the punched hole 10 the locking collar pin 6 with its punching section 24 is then pressed against the moulded parts 2, 4 by means of a riveting header. The locking collar pin 6 penetrates the moulded parts 2, 4 to the extent that its head 14 is located seated on the upper moulded part 2. A punched billet is ejected through the through hole 28 of the locking collar 8 and the punching section 24 is sectionally led out of the through hole 28. If the head 14 is designed as a countersunk head it is impressed into the upper moulded part 2 in a manner appropriate to the depression in the latter. By the application of radial pressure force the locking collar 8 is then deformed such that the locking collar 8 is squeezed together with at least two of the locking grooves 26. The moulded parts 2, 4 are now securely locked between the head 14 of the locking collar pin 6 and the locking collar 8. Here a high level of strength is achieved in the joint 1 as a result of the engagement of the locking collar 8 with a plurality of locking grooves 26. The height h of the locking collar 8 has thereby not been altered, or has virtually not been altered, as a result of the application of radial pressure.

Figure 3:
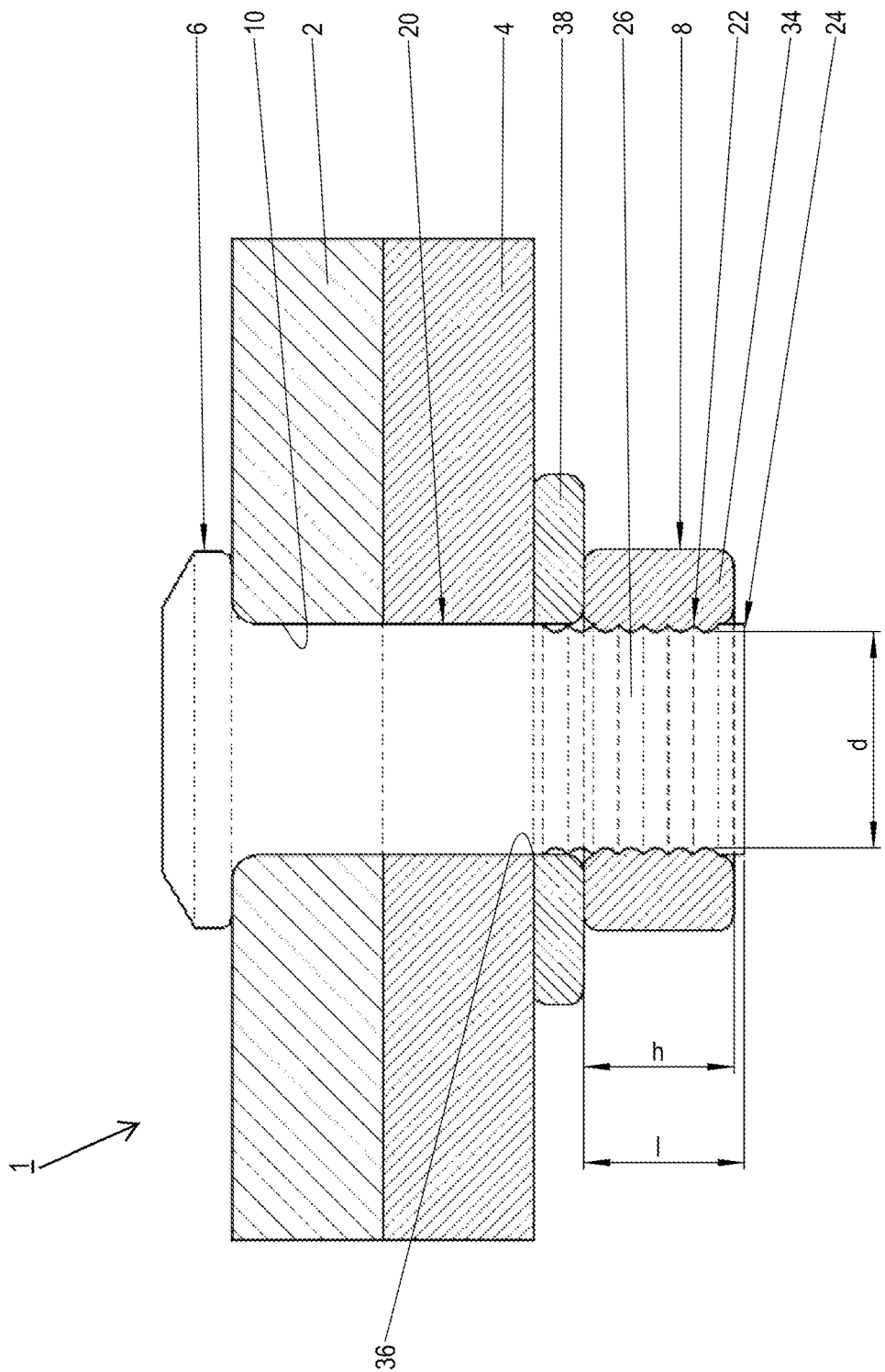
FIG. 3 shows a section through a joint using a third example of an embodiment of the inventive connecting system.

FIG. 3 shows a joint 1 between two moulded parts 2, 4 that are connected with one another using a third example of an embodiment of the inventive connecting system. In contrast to the second example of an embodiment in FIG. 2, in this example of an embodiment a cutting die is not integrated into a locking collar 8, but instead is formed as a separately, i.e., discretely, manufactured cutting ring 38, which after the punching operation remains on the locking section 22. Consequently the locking collar 8 in this example of an embodiment has just a deformation section 34, with what is preferably a low hardness. The locking collar 8 can therefore be a locking collar 8 in accordance with the first example of an embodiment in FIG. 1.

The cutting die 38 has a radially internal cutting edge 36 and in comparison to the locking collar 8 has a higher level of hardness, i.e., strength. It is aligned flush with the locking collar 8 and is preferably connected on its end face with the locking collar 8 in a material bond, or a force fit, or a form fit. It is, for example, pressed onto the locking collar 8, or is adhesively bonded or welded to the latter.

The locking collar pin 6 corresponds to that in the above examples of an embodiment in FIGS. 1 and 2, and has a central shank section 20, a locking section 22 and a punching section 24.

The third example of an embodiment of the inventive connecting system enables the execution of a single-stage joining method in accordance with FIG. 2. However, in contrast to the example of an embodiment in FIG. 2, during the punching operation an axial counter-support does not need to make contact directly with the locking collar 8, but rather can be positioned on the cutting ring 38. For purposes of locating the counter-support, the cutting ring 38, as shown in FIG. 3, can have a larger external diameter than the locking collar 8. Alternatively, however, the locking collar 8 can also have, for example, openings on its periphery, through which the counter-support can be led, so that the external diameter of the cutting ring 38 can be the same as, or even smaller than, the external diameter of the locking collar 8.

The execution of the single-stage joining method is then possible even if the cutting ring 38 is not connected with the locking collar 8. However, the cutting ring 38 and the locking collar 8 must then be secured against any alteration of location relative to one another during the punching operation.

Figure 4:
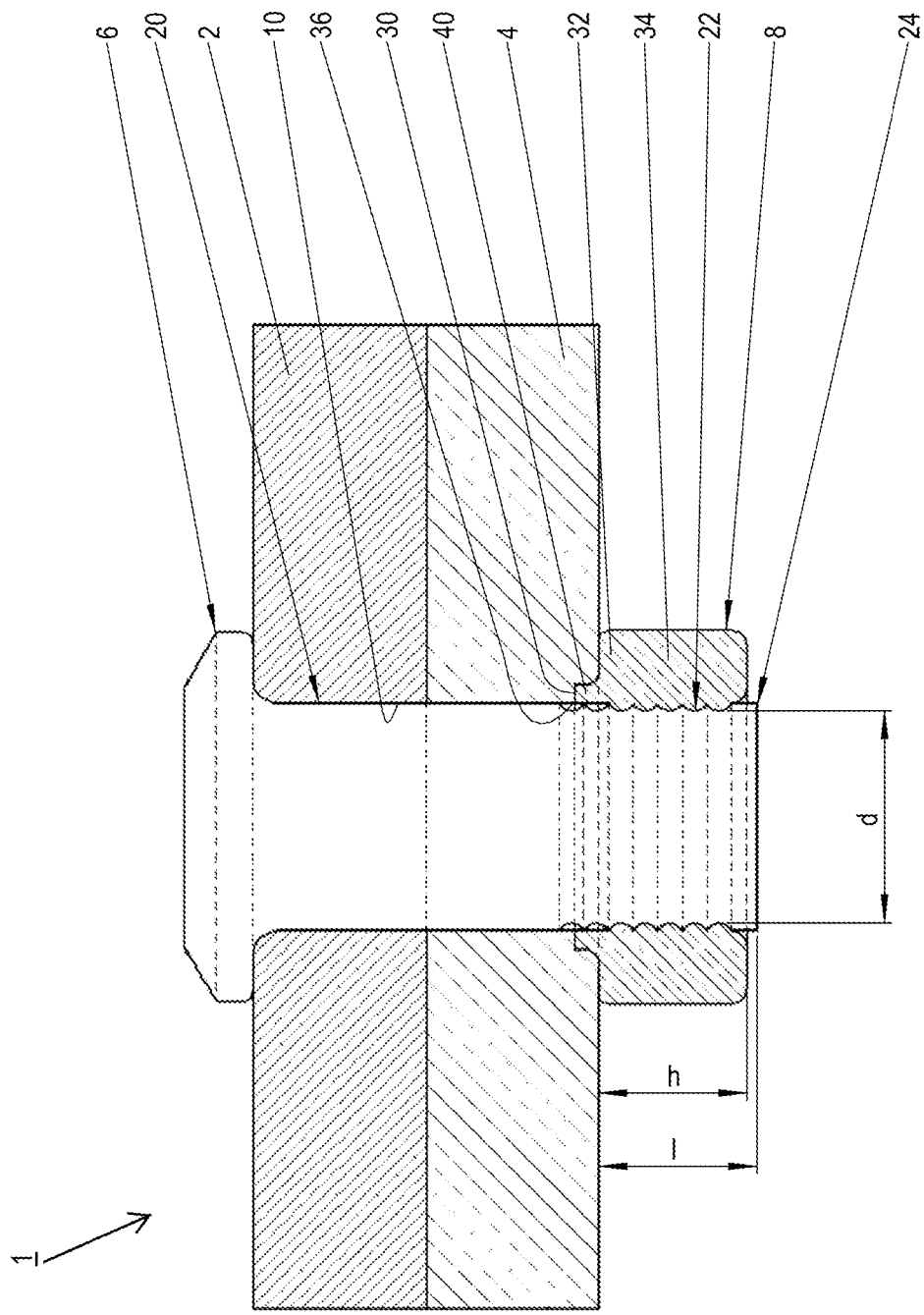
FIG. 4 shows a section through a joint using a fourth example of an embodiment of the inventive connecting system.

FIG. 4 shows a joint 1 between two moulded parts 2, 4 that are connected with one another using a fourth example of an embodiment of the inventive connecting system. In contrast to the second example of an embodiment in FIG. 2, in this example of an embodiment a locking collar 8 has an axial shaping projection 40 extending around its periphery in the region of its integral die section 32, and thus has a step-type contact surface 30. By virtue of the integrated die section 32 the locking collar 8 in this example of an embodiment undertakes the two functions of punching and locking, in an analogous manner to the second example of an embodiment in FIG. 2.

The shaping projection 40 has a radially internal integrated cutting-edge 36 and enables the use of the locking collar 8 as a shaping die, as a result of which during the punching operation the lower moulded part 4 is strain hardened in the outlet region of the punched hole 10. The die section 32, and in particular the shaping projection 40, are preferably hardened. A deformation section 34 of the locking collar 8 is preferably unhardened.

Since the locking collar 8 is not radially pressed together with the locking collar pin 6 in the region of the shaping projection 40, the shaping projection 40 is not taken into account in the height h of the locking collar 8. Thus the locking collar 8, in this example of an embodiment also, preferably has a height h that is somewhat smaller than a length of a shank region of the locking collar pin 6 projecting out of the punched hole 10.

The locking collar pin 6 corresponds to that in the above examples of embodiments in FIGS. 1, 2 and 3, and has a central shank section 20, a locking section 22 and a punching section 24.

The above-described fourth example of an embodiment of the inventive connecting system enables the execution of a single-stage joining method in accordance with FIGS. 2 and 3. Additionally, however, the shaping projection 40 is axially impressed into the lower moulded part 4 during the punching operation of the punched hole 10, so that the lower moulded part 4 is strain hardened in the outlet region of the punched hole 10. Here however, as can be discerned in FIG. 4, the shaping projection 40 is not impressed into the locking grooves 26 encompassed by the former on the internal periphery, and is not subjected to any plastic deformation. The shaping projection 40 is thus dimensionally stable.

Figure 5:
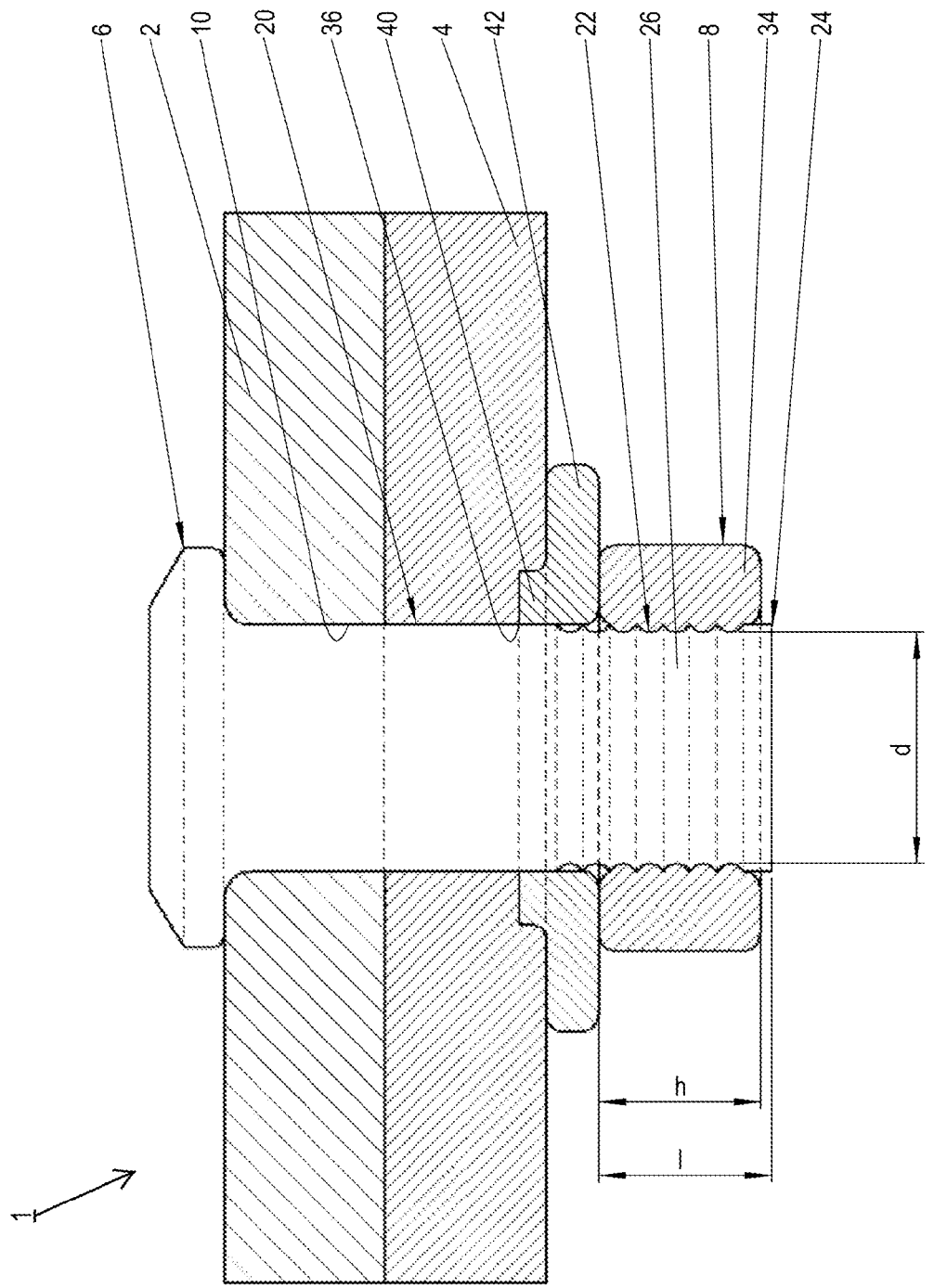
FIG. 5 shows a section through a joint using a fifth example of an embodiment of the inventive connecting system.

In the joint 1 shown in FIG. 5 between two moulded parts 2, 4 that are connected with one another using a fifth example of an embodiment of the inventive connecting system, the shaping die is not integrated into a locking collar 8, but rather is formed as a separately, i.e., discretely, manufactured shaping ring 42. The locking collar 8 has just a deformation section 34, and can be a locking collar 8 in accordance with the first and third examples of embodiments in FIGS. 1 and 3.

The shaping ring 42 has a shaping projection 40 with a radially internal cutting edge 36 and in comparison to the locking collar 8 has a higher level of hardness, i.e., strength. It is aligned flush with the locking collar 8 and is preferably connected on its end face with the locking collar 8 in a material bond, or a force fit, or a form fit.

The locking collar pin 6 corresponds to that in the above examples of embodiments in FIGS. 1, 2, 3 and 4, and has accordingly a central shank section 20, a locking section 22 and a punching section 24.

The fifth example of an embodiment of the inventive connecting system enables the execution of a single-stage joining method, wherein by means of the shaping projection 40 the lower moulded part 4 is strain hardened in the outlet region of the punched hole 10. As can be discerned in FIG. 5, the shaping projection 42 is not, however, impressed into the locking grooves 26 encompassed by the former on the internal periphery. The locking of the joint 1 is undertaken exclusively by the application of radial pressure by the locking collar 8 onto the locking grooves 26. The shaping ring 42 is thus dimensionally stable. In an analogous manner to the example of an embodiment in FIG. 3 an axial counter-support does not need to make contact directly with the locking collar 8 during the punching operation, but rather can be located on the shaping ring 42. For purposes of locating the counter-support, the shaping ring 42, as shown in FIG. 5, can have a larger external diameter than the locking collar 8. Alternatively, however, the locking collar 8 can also have, for example, openings on its periphery, through which the counter-support can be led, so that the external diameter of the shaping ring 42 can be the same as, or even smaller than, the external diameter of the locking collar 8.

The execution of the single-stage joining method is then possible even if the shaping ring 42 is not connected with the locking collar 8. However, the shaping ring 42 and the locking collar 8 must then be secured against any alteration of location relative to one another during the punching operation.

Insofar as in all the above described examples of embodiments the locking section 22 is provided with an external thread instead of the locking grooves 26, and the locking collar 8 is provided with an internal thread, the locking collar 8 can also be screwed onto the locking section 22 for purposes of locking.

The single-stage method in accordance with FIGS. 2, 3, 4 and 5 can in principle also be executed as a two-stage joining method. However, in this case a die, or cutting ring 38, or shaping ring 42, is to be removed after the punching operation in accordance with FIG. 1.

Since in the case of the first, second and third examples of embodiments in accordance with FIGS. 1, 2 and 3, no shaping projection 40 is provided, in these three examples of embodiments the locking collar-side, i.e., lower, moulded part 4 can be made of a material that can be punched, such as plastic, that cannot be strain hardened, or cannot be plastically strain hardened. The inventive connecting system in accordance with these examples of embodiments, when using a locking collar pin 6, can thus be used with a universal head, i.e., with no countersunk head, independently of the material of the moulded parts 2, 4.

Since in the fourth and fifth examples of embodiments in accordance with FIGS. 4 and 5 a shaping projection 40 is provided, the lower moulded part 4 must be made of a material that can be strain hardened. The punchable material of the upper, i.e., head-side, moulded part 2 can be freely selected, if a locking collar pin 6 with a universal head is selected. However, if the locking collar pin 6 has a countersunk head, then the upper moulded part 4 must also be capable of being strain hardened.

Disclosed is a method for the connection of moulded parts, wherein a locking collar pin with locking grooves or with an external thread, is driven through the moulded parts and subsequently a locking collar is locked together with at least some of the locking grooves, or with threaded sections of the locking collar pin, by the application of radial pressure, or by means of a screwing operation; also disclosed is a connecting system with a locking collar pin, which has a punching section for purposes of punching through the moulded parts, and also locking grooves for purposes of active engagement with a locking collar; the latter extends over at least two adjacent locking grooves in the axial direction, or over at least two adjacent thread sections in the axial direction.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE SYMBOL LIST

1 Joint
2 Head-side, i.e., upper, moulded part
4 Locking collar-side, i.e., lower, moulded part
6 Locking collar pin
8 Locking collar
10 Punched hole
12 Hole wall
14 Head
16 Shank
18 Seating surface
20 Central shank section
22 Locking section
24 Punching section
26 Locking grooves
28 Through hole
30 Contact surface
32 Die section
34 Deformation section
36 Cutting edge
38 Cutting ring
40 Shaping projection
42 Shaping ring
d Core diameter
h Height
l Length

The invention claimed is:

1. A connecting system for the joining of moulded parts, the connecting system comprising:
   a locking collar pin comprising a head and a shank, wherein the shank comprises a locking section and a punching section, the punching section arranged to be punched through the moulded parts from a first surface of the moulded parts such that a part of the locking collar pin extends out from a second surface of the moulded parts, and with a locking collar to be locked on the locking collar pin, wherein the locking section comprises one of: a multiplicity of locking grooves and an external thread, the locking grooves or external thread arranged to engage with the locking collar,
   wherein the locking collar extends over at least two adjacent locking grooves in an axial direction of the part of the locking collar pin that extends out from the second surface of the moulded parts, or over at least two adjacent threads in the axial direction of the part of the locking collar pin that extends out from the second surface of the moulded parts, wherein the head is arranged not to penetrate through the moulded parts from the first surface to the second surface, and wherein in a mounted condition of the connecting system the punching section is formed at the end of the shank as an extension of the locking section wherein in the mounted condition the shank is in a final state and connected to the locking collar.

2. The connecting system in accordance with claim 1, wherein the locking collar has an internal thread.

3. The connecting system in accordance with claim 1, wherein the locking collar has a cutting edge.

4. The connecting system in accordance with claim 3, wherein the cutting edge is formed on a shaping projection on an end face of the locking collar.

5. The connecting system in accordance with claim 1, wherein a cutting ring manufactured discretely from the locking collar is provided with a cutting edge.

6. The connecting system in accordance with claim 1, wherein a shaping ring manufactured discretely from the locking collar is provided with an integrated cutting edge.

7. The connecting system in accordance with claim 1, wherein the cutting edge is formed on a shaping projection on an end face of the locking collar.

8. The connecting system in accordance with claim 1, wherein a cutting ring manufactured discretely from the locking collar is provided with a cutting edge.

9. The connecting system in accordance with claim 1, wherein a shaping ring manufactured discretely from the locking collar is provided with an integrated cutting edge.

* * * * *